J. B. DRAHONOVSKY.
RESILIENT WHEEL.
APPLICATION FILED NOV. 13, 1914.
1,169,779.
Patented Feb. 1, 1916.
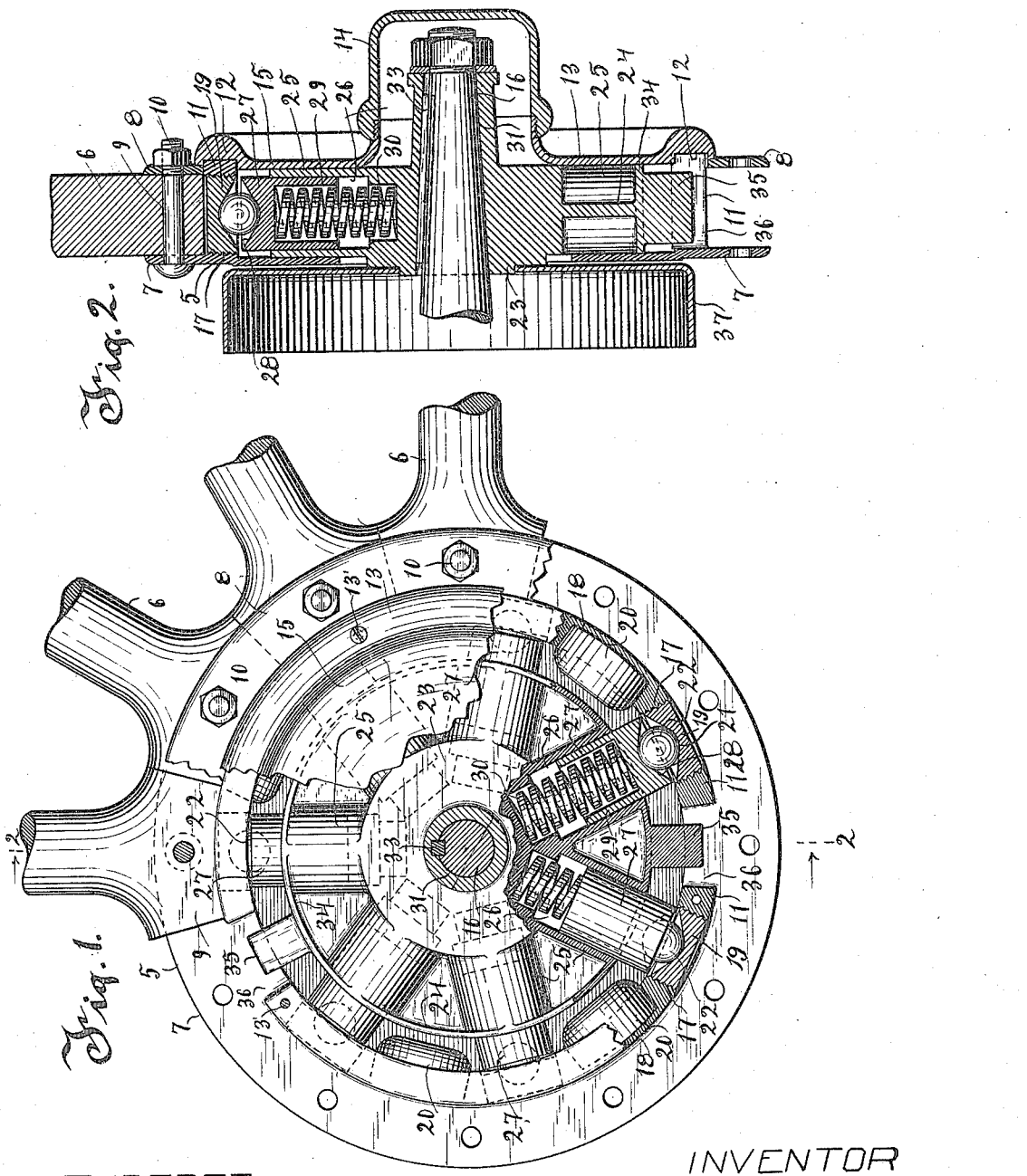
WITNESSES
Q. F. Miller.
Emily Schowalter
INVENTOR
John B. Drahonovsky.
By Morsell, Keeney & French,
ATTORNEYS.

UNITED STATES PATENT OFFICE.

JOHN B. DRAHONOVSKY, OF MILWAUKEE, WISCONSIN.

RESILIENT WHEEL.

1,169,779.  Specification of Letters Patent.  Patented Feb. 1, 1916.

Application filed November 13, 1914. Serial No. 871,874.

*To all whom it may concern:*

Be it known that I, JOHN B. DRAHONOVSKY, a citizen of the United States, and resident of Milwaukee, in the county of Milwaukee and State of Wisconsin, have invented new and useful Improvements in Resilient Wheels, of which the following is a description, reference being had to the accompanying drawings, which are a part of this specification.

This invention relates to improvements in resilient wheels of that type in which the resilient means is included in the hub portion of the wheel.

One of the objects of the invention is to provide a resilient wheel in which the hub portion of the wheel is yieldingly mounted within the wheel to cushion the hub portion against shocks and vibrations due to inequalities of the road traveled over.

A further object of the invention is to provide a resilient wheel in which the strain of the load is distributed equally to all of the resilient members of the wheel.

A further object of the invention is to provide a resilient wheel having supplemental resilient means for receiving the abnormal shocks and vibrations of very rough roads or very heavy loads.

A further object of the invention is to provide a resilient wheel having means for locking the two portions of the wheel together when the wheel is subject to undue strain in starting or stopping.

A further object of the invention is to provide a resilient wheel which is of simple construction, is strong and durable, and is well adapted for the purpose desired.

With the above and other objects in view the invention consists of the improved resilient wheel and its parts and combinations as set forth in the claims, and all equivalents thereof.

In the accompanying drawing in which the same reference characters indicate the same parts in all of the views, Figure 1 is a side view of a portion of a wheel embodying the improved construction, parts being broken away and other parts being in section to show interior construction; and Fig. 2 is a vertical sectional view thereof taken on line 2—2 of Fig. 1.

Referring to the drawing the numeral 5 indicates the outer hub of a wheel provided with spokes 6 which extend to and are connected to the wheel rim (not shown) in the ordinary manner. The outer hub consists of an inner annular flanged plate 7 and an outer annular plate 8 which are adapted to hold the inner end portions of the spokes 6 clamped therebetween. The inner ends 9 of the spokes are of segmented form and snugly fit between the plates and abut against the flange and are held in position by bolts and nuts 10, the bolts extending through the segmental portions of the spokes and through the rim plates. The flanges 11 are of annular form and project outwardly from the inner plates and through the opening of the outer plate and a short distance beyond said outer plate to form an annular shoulder for receiving the grooved portion 12 of the wheel hub cap or cover 13. This cap or cover is secured in position by screws 13′ and is preferably formed in two parts so that the smaller portion 14 may be easily unscrewed from the larger portion 15 to gain access to the axle 16 of the wheel. The flange portions 11 are provided with threaded radial openings 17 and with inner interposed recesses 18. Hardened cup members 19 are threaded in the openings 17 and yielding bumper members 20 are inserted in the recesses 18 and project inwardly therefrom. The hardened cup members are provided with semi-conical recesses 21 having rounded apexes into which extend steel balls 22.

The inner hub 23 of the wheel is provided with a radial flange 24 having radially extending enlargements 25 provided with radial bores 26 into which slidably extend bearing plungers 27. These plungers have conical recesses or pockets 28 in their outer ends to receive the steel balls 22 before mentioned which are interposed between the plungers and the cup members 19. The inner ends of the bearing plungers are also recessed as indicated by the numeral 29 to receive the outer ends of coiled springs or other resilient members 30 which are positioned within the boxes 26 and serve to yieldingly hold the inner hub centrally within the outer hub. The inner hub is held against lateral movement by the engagement of the enlargements 25 with the inner sides of the inner plate 7 and the cap 13, between which the enlargements of the flange 24 play vertically.

The inner hub is provided with a tapered bore 31 through which the axle 16 extends and is held therein by a nut 32 threaded on its outer end. When the wheel is used as a driver the hub is preferably keyed to the shaft as indicated by the numeral 33, but when used as a front or steering wheel the keyed portion is omitted.

The radial flange 24 of the inner hub is provided with an outer annular flange 34 which is adapted to strike against the bumper members 20 when the wheel is subjected to abnormal shocks and further cushion the blow.

In order to limit the revoluble movement of the inner hub with relation to the outer hub, stop lugs 35 projecting outwardly from the annular flange are provided which enter the spaces 36 formed between the annular flanges 11 of the inner plate 7 and play between the ends of said flanges. As the spaces 36 are wider than the lugs the said lugs will not strike the flanges while under normal traction strain, but will only strike when the parts revolve beyond the movement provided for.

In operation the inner hub will be held yieldingly in position within the outer hub by means of the balls and the bearing plungers and the springs and any vertical movement of the outer or inner member with respect to the other member will be yieldingly resisted by the springs. The springs in vertical axial alinement with the hub will be directly compressed or expanded while the springs on the opposite sides of the vertical line will be forced inwardly by the balls riding up the inclined walls of the conical pockets of the cup members and the bearing plungers. The traction strain will also be yieldingly resisted by the inclined walls of the pockets, within the movement permitted, and beyond this point the stop lugs will positively lock the parts together until the abnormal strain has lessened.

From the foregoing description it will be seen that the resilient wheel is of very simple construction and is well adapted for the purpose described.

What I claim as my invention is:

1. A resilient wheel, comprising an outer hub member provided with a plurality of bearing cups having conical recesses, an inner hub member extending into the outer hub and provided with a plurality of radial bores which register with the conical recesses, plungers yieldingly reciprocally mounted in the bores and provided with conical recesses in their outer ends, and balls interposed between the plungers and the cups and entering the conical recesses.

2. A resilient wheel, comprising an outer hub member formed of a pair of annular plates positioned in spaced relation, one of said plates having annular flange portions provided with radial cup openings, bearing cups mounted in said openings and having conical recessed portions, a cap member mounted on the outer hub member, an inner hub member extending into the outer hub and having a plurality of radially extending enlargements which slidably engage the inner sides of the inner plate and the cap, said enlargements having radial bores, plungers yieldingly reciprocally mounted in said radial bores and provided with conical recesses in their outer ends which register with the recesses of the cups, and balls interposed between the plungers and the cups and entering the conical recesses.

3. A resilient wheel, comprising an outer hub member formed of a pair of annular plates positioned in spaced relation, one of said plates having annular flange portions provided with radial cup openings and having conical recessed portions, a cap member mounted on the outer hub member, an inner hub member extending into the outer hub and having a plurality of radially extending enlargements which slidably engage the inner sides of the inner plate and the cap, said enlargements having radial bores, plungers yieldingly reciprocally mounted in said radial bores and provided with conical recesses in their outer ends which register with the recesses of the cups, balls interposed between the plunger and the cups and entering the conical recesses, and means for limiting the revoluble movement of the inner hub member with respect to the revoluble movement of the outer hub member.

4. A resilient wheel, comprising an outer hub member formed of a pair of annular plates positioned in spaced relation, one of said plates having annular flanged portions provided with radial cup openings, said flanged portions having a spaced portion, spokes interposed between the plates and projecting outwardly therefrom, bearing cups mounted in said openings and having conical recessed portions, a cap member on the outer hub member, an inner hub member extending into the outer hub and having a plurality of radially extending enlargements which slidably engage the inner sides of the inner plate and the cap, said enlargements having radial bores in alinement with the bearing cups, plungers reciprocally mounted in said bores and provided with conical recesses in their outer ends, balls interposed between the plungers and the cups and entering the conical recesses, coiled springs positioned within the bores and engaging the plungers, and a stop lug projecting outwardly from the inner hub and entering the spaced opening of the annular flange portions.

5. A resilient wheel, comprising an outer hub member provided with a plurality of threaded cup openings and interposed bumper recesses, bearing cups threaded into said openings, resilient bumpers mounted within the bumper recesses, an inner hub member extending into the outer hub and provided with a plurality of radial enlargements and with other portions adapted to engage the bumpers, said enlargements provided with radial bores which register with the cups, plungers reciprocally extending into the bores, said plungers having recessed inner portions and conical recesses in their outer ends, balls interposed between the plungers and the cups and extending into the conical recesses of both members, coiled springs interposed between the plungers and the inner hub and extending into the hub bores and plunger inner recesses, and means for limiting the movement of the inner hub with respect to the outer hub.

In testimony whereof, I affix my signature, in presence of two witnesses.

JOHN B. DRAHONOVSKY.

Witnesses:
A. C. ROSSBACH,
C. H. KEENEY.

Copies of this patent may be obtained for five cents each, by addressing the "Commissioner of Patents, Washington, D. C."